US012782519B2

(12) United States Patent
Franke et al.

(10) Patent No.: US 12,782,519 B2
(45) Date of Patent: Nov. 3, 2026

(54) DISTANCE MEASUREMENT SYSTEM

(71) Applicant: IFM Electronic GmbH, Essen (DE)

(72) Inventors: Michael Franke, Dresden (DE); Carl Philip Heising, Wilnsdorf (DE)

(73) Assignee: IFM Electronic GmbH, Essen (DE)

(*) Notice: Subject to any disclaimer, the term of this patent is extended or adjusted under 35 U.S.C. 154(b) by 613 days.

(21) Appl. No.: 18/266,060

(22) PCT Filed: Dec. 9, 2021

(86) PCT No.: PCT/EP2021/084941
§ 371 (c)(1),
(2) Date: Jun. 8, 2023

(87) PCT Pub. No.: WO2022/122891
PCT Pub. Date: Jun. 16, 2022

(65) Prior Publication Data

US 2024/0053445 A1 Feb. 15, 2024

(30) Foreign Application Priority Data

Dec. 11, 2020 (DE) ......................... 102020133187.8

(51) Int. Cl.
*G01S 7/48* (2006.01)
*G01S 7/481* (2006.01)
(Continued)

(52) U.S. Cl.
CPC .......... *G01S 7/4816* (2013.01); *G01S 7/4915* (2013.01); *G01S 17/894* (2020.01)

(58) Field of Classification Search
CPC .... G01S 7/4816; G01S 7/4861; G01S 7/4865; G01S 7/4915; G01S 17/894
See application file for complete search history.

(56) References Cited

U.S. PATENT DOCUMENTS 6,731,336 B1 5/2004 Shinohara
10,418,407 B2 9/2019 Na et al.
(Continued)

FOREIGN PATENT DOCUMENTS

CN 106537174 B 3/2017
DE 102004037137 A1 3/2006
(Continued)

*Primary Examiner* — Kevin K Pyo
(74) *Attorney, Agent, or Firm* — LEASON ELLIS LLP

(57) ABSTRACT

The invention relates to a PMD light transit time sensor (22) for an optical distance measurement system, comprising an array of PMD light transit time pixels (21), said light transit time pixels having diode nodes (Ga, Gb) for an A channel and a B channel (A, B) and being connectable to a corresponding column line (cola, colb) via a first switch (S1) and to a reset potential (vreset) via a second switch (S2). The PMD light transit time sensor comprises multiple shift registers, which are constructed and connected to the pixels such that the two switches (S1, S2) can be switched in an alternating manner on the basis of register entries of the individual registers (FF), wherein multiple columns or rows are at least partly assigned to a shift register; and a switch matrix (80), which is designed such that the column lines (cola, colb) can be connected to one of a plurality of amplifiers (100) and multiple column lines (cola, colb) can be connected to a common amplifier (100). The light transit time sensor (22) is designed such that during an integration time period, the charges photogenerated on the light transit time pixel are accumulated on the diode nodes (diode a, diode b) and the connected column lines (cola, colb).

3 Claims, 9 Drawing Sheets

(51) Int. Cl.

| | |
|---|---|
| ***G01S 7/4915*** | (2020.01) |
| ***G01S 17/894*** | (2020.01) |

(56) References Cited

U.S. PATENT DOCUMENTS

| | | | | |
|---|---|---|---|---|
| 2011/0101206 | A1 | 5/2011 | Buettgen | |
| 2016/0133659 | A1 | 5/2016 | Chao et al. | |
| 2019/0280038 | A1 | 9/2019 | Keel | |
| 2023/0061837 | A1* | 3/2023 | Imoto | H10F 39/809 |
| 2024/0264307 | A1* | 8/2024 | Nakada | G01S 17/32 |

FOREIGN PATENT DOCUMENTS

| | | | |
|---|---|---|---|
| DE | 102015223674 | A1 | 6/2016 |
| DE | 102016205073 | A1 | 10/2016 |
| DE | 102018108379 | A1 | 10/2019 |
| EP | 3318895 | A1 | 5/2018 |

* cited by examiner

DISTANCE MEASUREMENT SYSTEM

The invention relates to a distance measurement system according to the type of the independent claim.

The distance measuring system relates to time-of-flight camera systems which obtain time-of-flight information or distances from the phase shift of emitted and received radiation. PMD cameras with photonic mixing detectors (PMD), as described for example in DE 197 04 496 A1, are particularly suitable as time-of-flight or 3D-TOF cameras.

From DE 10 2004 037 137 A1 already a device for distance measurement by use of time-of-flight pixels is known, in which, among others, an arrangement according to the triangulation principle is proposed. The time-of-flight pixels are arranged side by side in at least one row. Depending on which time-of-flight pixel detects the radiation reflected by the object, the distance of the object can be determined with the aid of a triangulation calculation. Furthermore, the distance can additionally be determined via the time of flight or the phase shift of the transmitted and received light.

A time-of-flight sensor for triangulation measurement is already known from DE 10 2015 223 675 A1, in which time-of-flight pixels that receive useful light are switched to a common integrator, and time-of-flight pixels that do not receive a useful signal are switched to a discard node.

It is an object of the invention to simplify the structure of a time-of-flight light sensor which is designed for a triangulation system.

In the following, the invention is explained in more detail based on exemplary embodiments with reference to the drawings.

Figure 1:
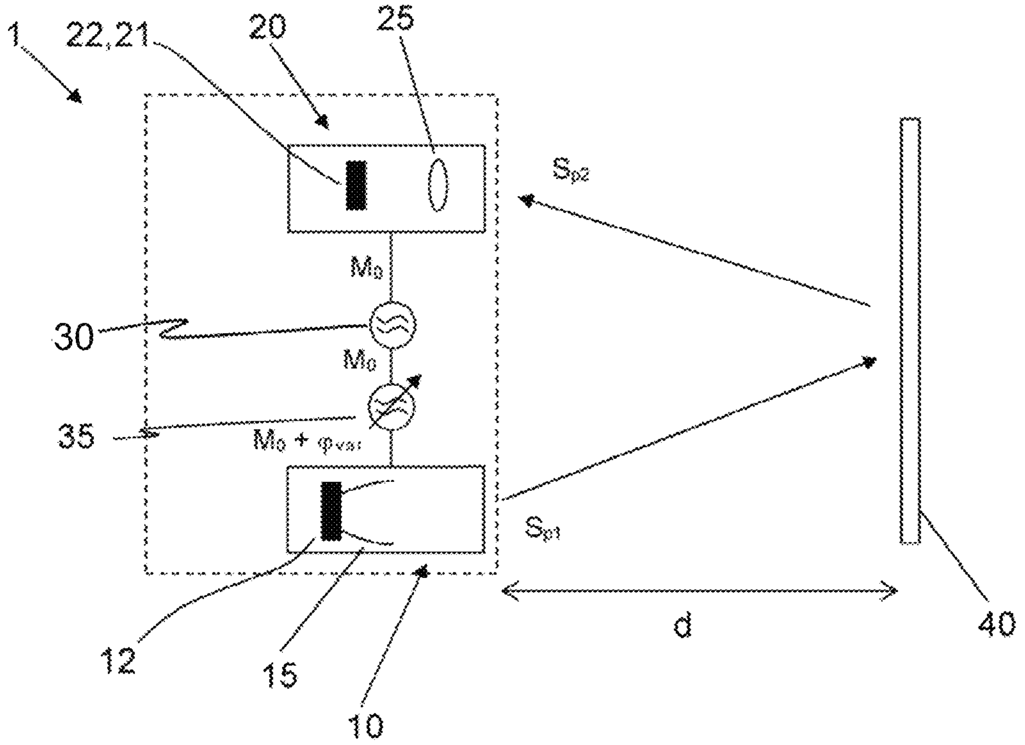
Figure 2:
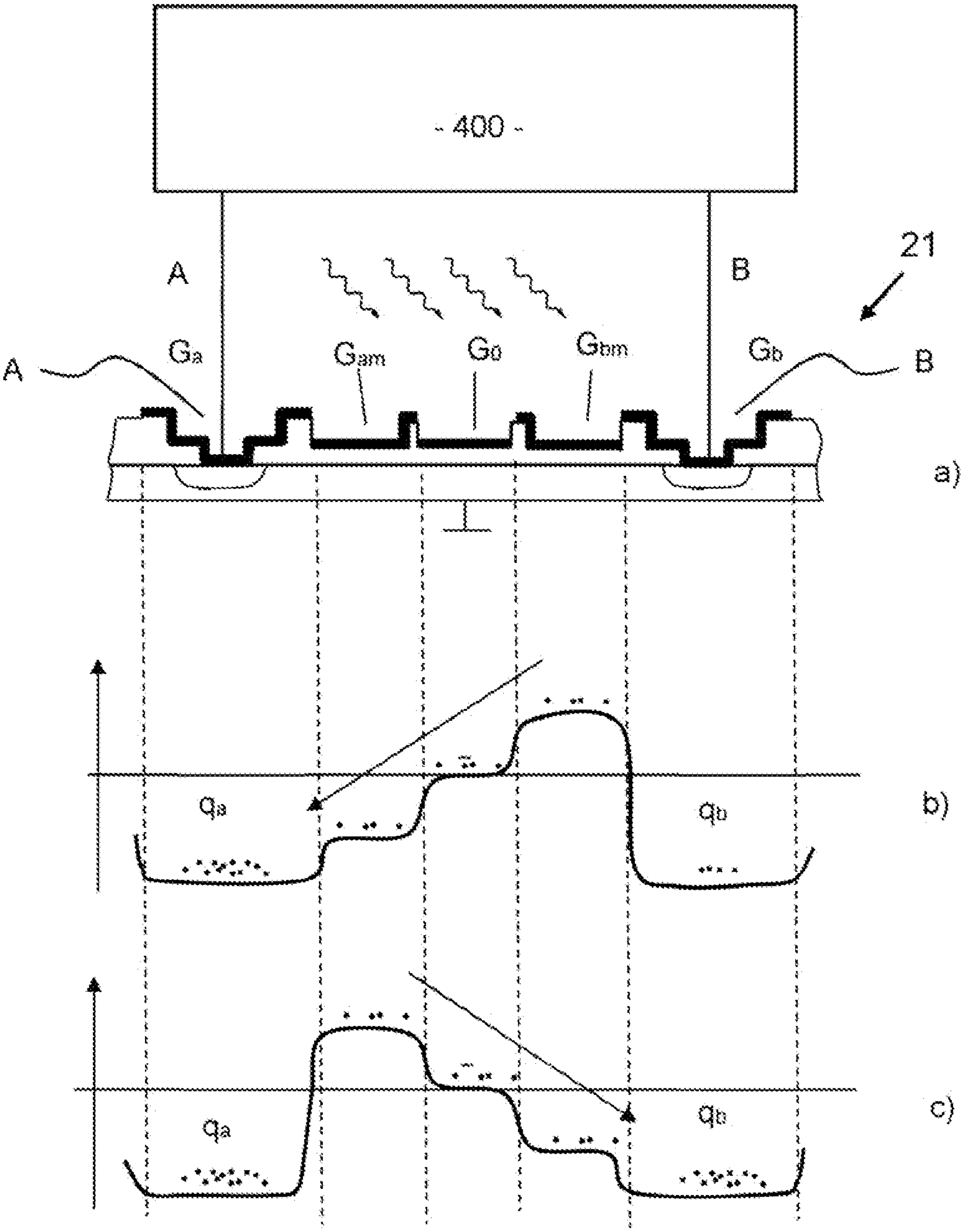
Prior Art Fig. 2
Figure 3:
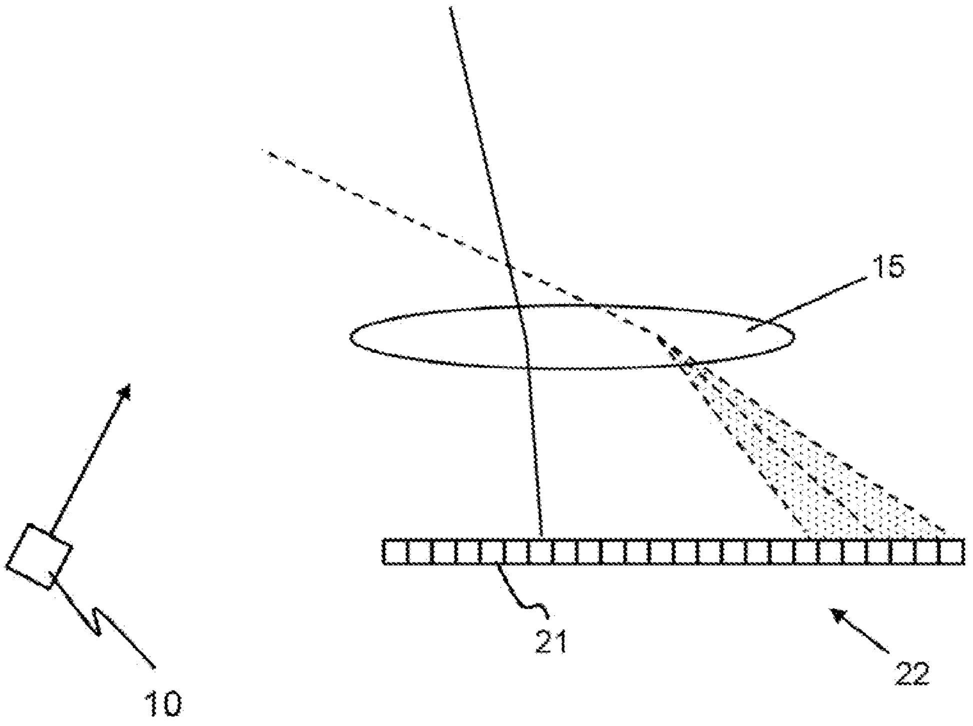
Figure 4:
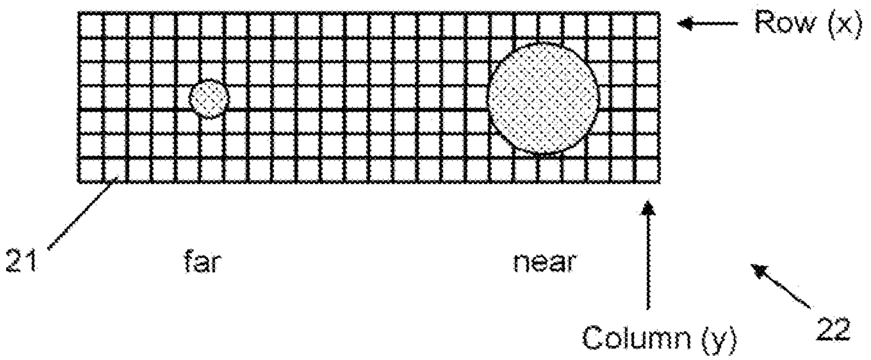
Figure 5:
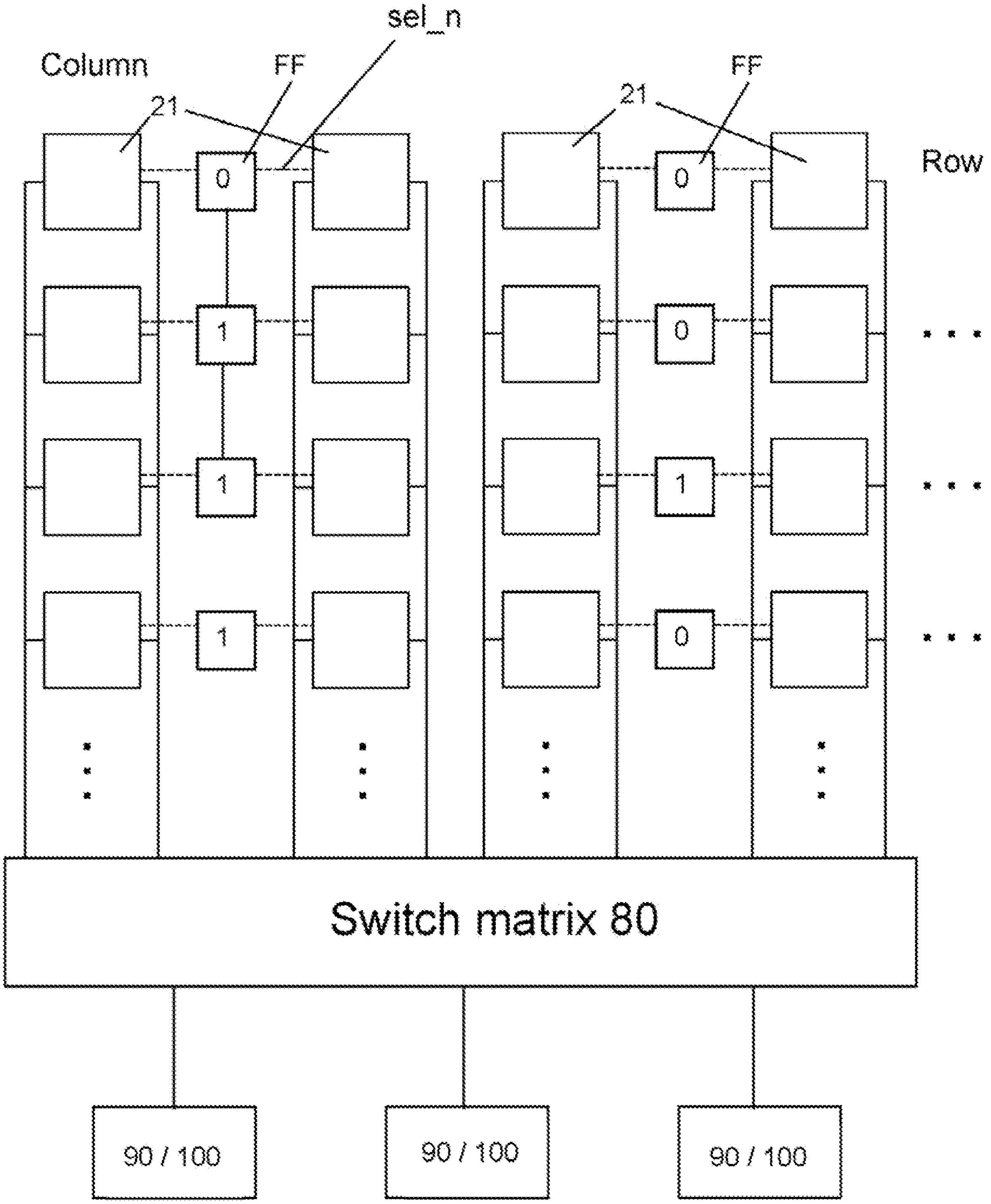
Figure 6:
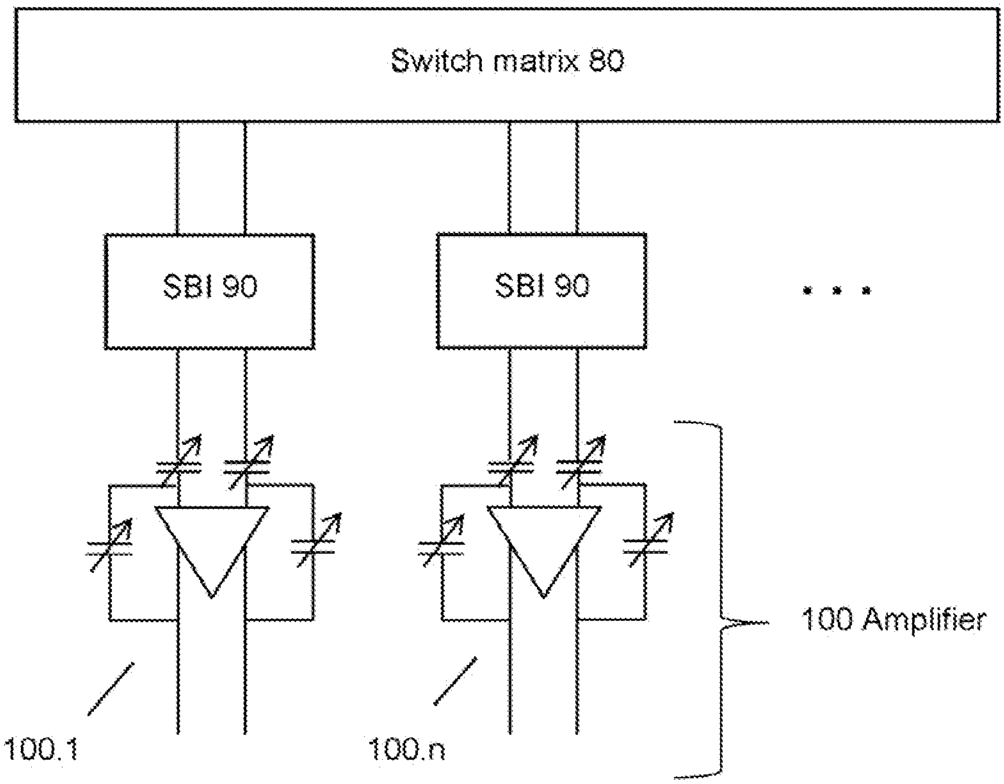
Figure 7:
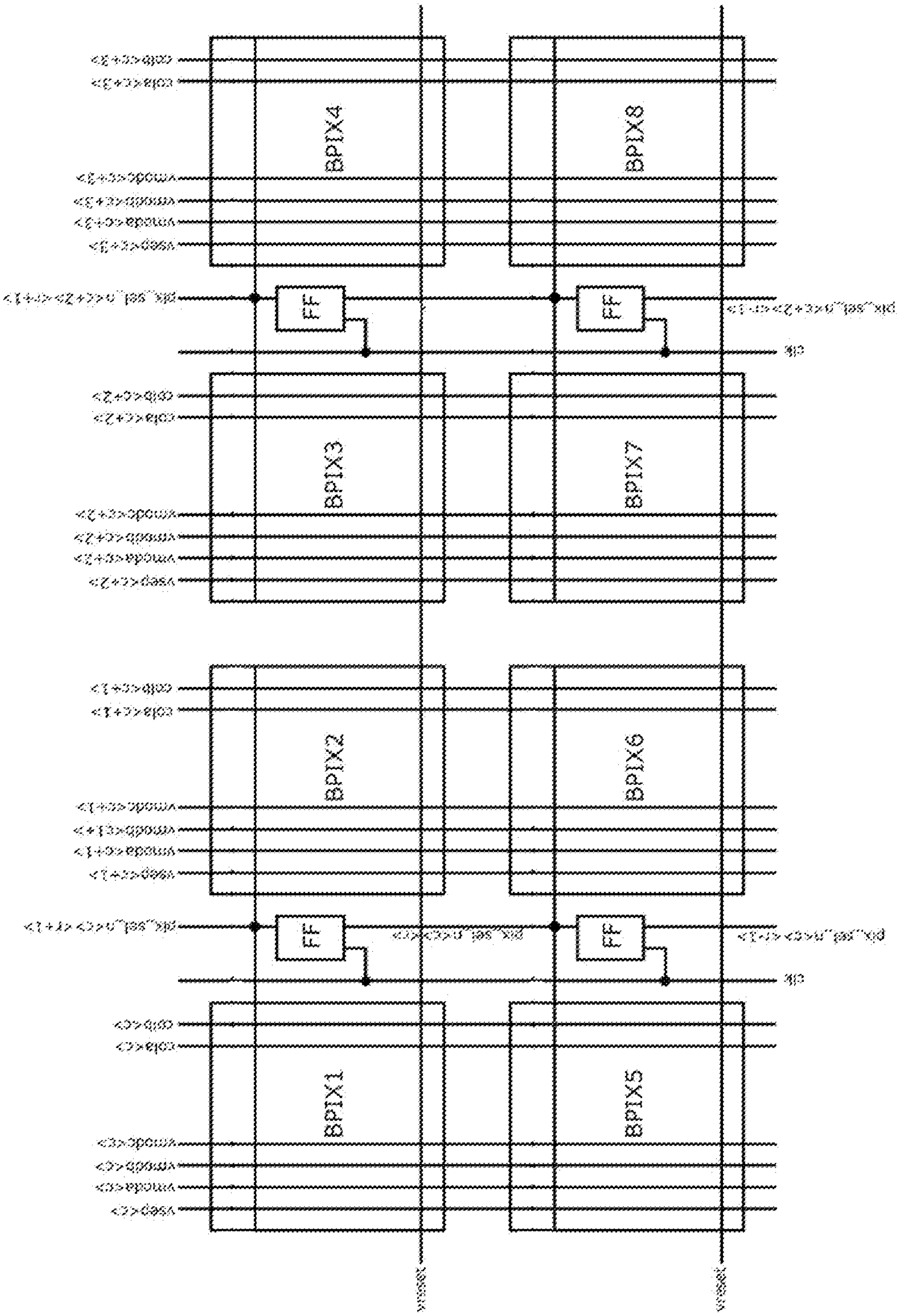
Figure 8:
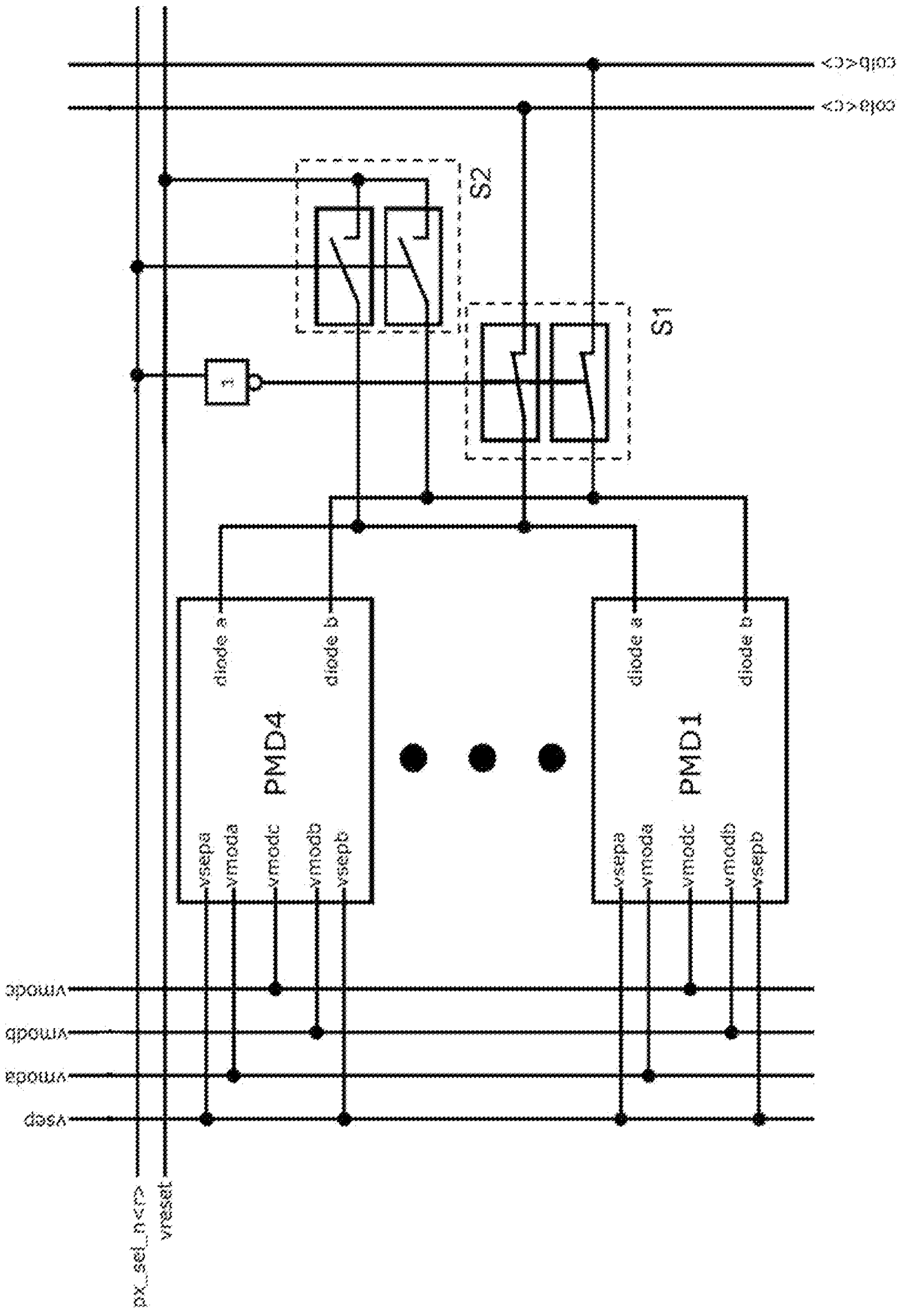

The figures schematically show:

FIG. 1 a time-of-flight camera system;

FIG. 2 a time-of-flight pixel according to the PMD principle;

FIG. 3 a triangulation for a near and far range;

FIG. 4 a top view of the arrangement according to FIG. 3;

FIG. 5 an interconnection of sensor columns according to the invention;

FIG. 6 a plurality of amplifiers arranged downstream of the switch matrix;

FIG. 7 a detail of the pixel matrix;

FIG. 8 a binning of time-of-flight pixels according to the invention; and

Figure 9:
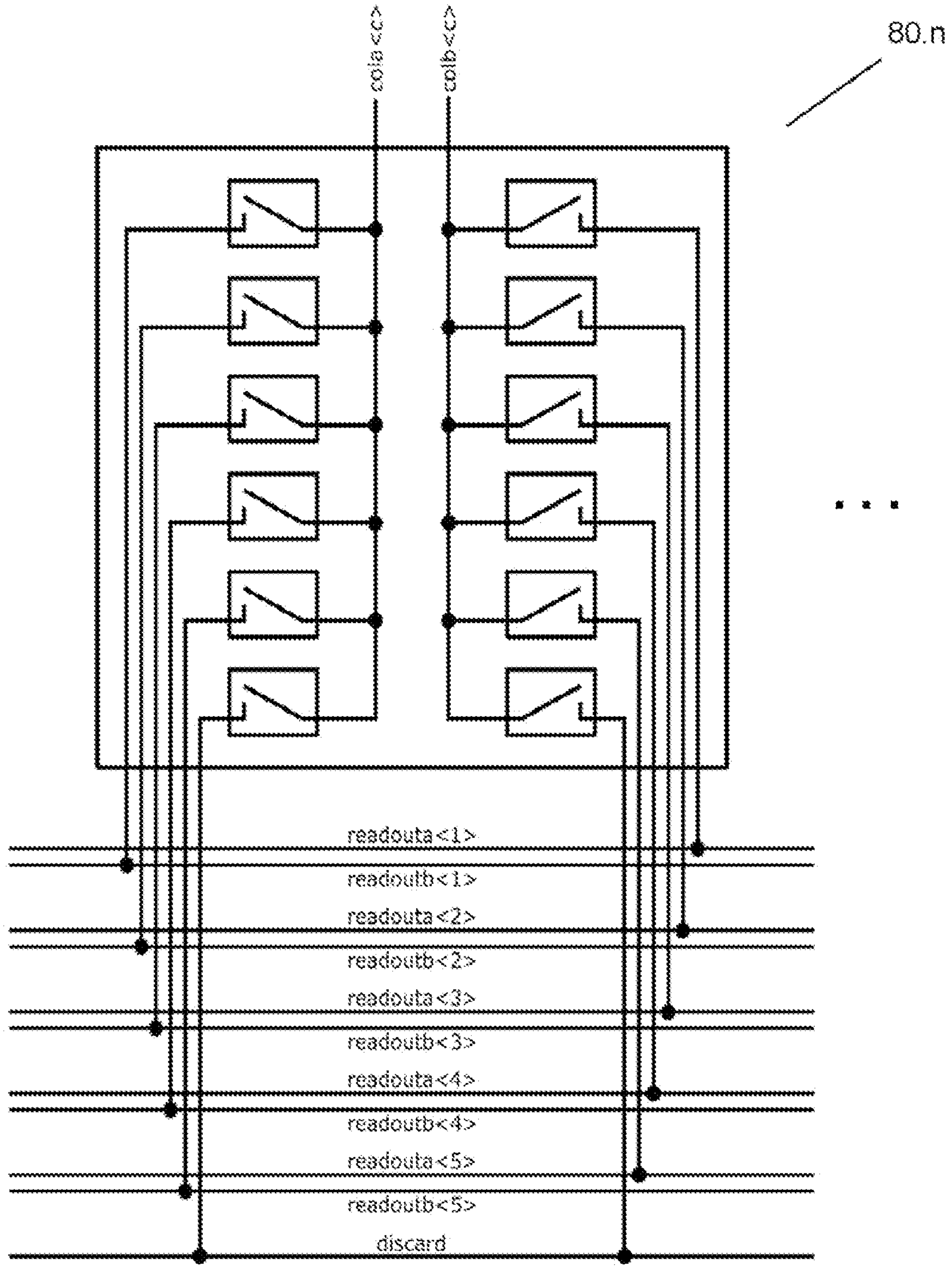

FIG. 9 an embodiment of the switch matrix.

In the following description of the preferred embodiments, the same reference symbols denote the same or comparable components.

FIG. 1 shows a measurement situation for an optical distance measurement by use of a time-of-flight camera, as known for example from DE 197 04 496.

The time-of-flight camera system 1 comprises an emission unit or an illumination module 10 with an illumination 12 and an associated beam shaping optics 15, and a receiving unit or time-of-flight camera 20 comprising a receiving optics 25 and a time-of-flight sensor 22.

The time-of-flight sensor 22 comprises at least one time-of-flight pixel 21, preferably also a pixel array, and is designed in particular as a PMD sensor. The receiving optics typically consists of a plurality of optical elements for improving the imaging proper-ties. The beam shaping optics 15 of the emission unit 10 can be configured, for example, as a reflector or lens optics. In a very simple embodiment, it may also be possible to dispense with optical elements on both the receiving and the emission side.

The measuring principle of this arrangement is essentially based on the fact that, starting from the phase shift of the emitted and received light, the time of flight and thus the distance traveled by the received light can be determined. For this purpose, the light source 12 and the time-of-flight sensor 22 are jointly supplied with a certain modulation signal $M_0$ with a base phase position $\varphi_0$ via a modulator 30. In the example shown, a phase shifter 35 is further provided between the modulator 30 and the light source 12, by means of which the base phase $\varphi_0$ of the modulation signal $M_0$ of the light source 12 can be shifted by defined phase positions $\varphi_{var}$. For typical phase measurements, phase positions $\varphi_{var}$=0°, 90°, 180°, 270° are preferably used.

According to the set modulation signal, the light source 12 emits an intensity modulated signal $S_{p1}$ with the first phase position p1 or p1=($\varphi_0$+$\varphi_{var}$). This signal $S_{p1}$ or the electromagnetic radiation is reflected by an object 40 in the case shown and, due to the distance traveled, hits the time-of-flight sensor 22 with a corresponding phase shift $\Delta\varphi(t_L)$ with a second phase position p2=$\varphi_0+\varphi_{var}+\Delta\varphi(t_L)$ as a received signal $S_{p2}$.

The modulation signal $M_0$ is mixed with the received signal Sp2 in the time-of-flight sensor 22, wherein the phase shift or the object distance d is determined from the resulting signal.

Preferably, the illumination source or light source 12 is implemented by infrared light emitting diodes. Of course, other radiation sources in other wavelength ranges are also conceivable.

FIG. 2 shows a cross-section through a time-of-flight pixel of a photomixing detector as known for example from DE 197 04 496 C2. The modulation photogates Gam, $G_0$, Gbm form the light sensitive area of a PMD pixel. According to the voltage applied to the modulation gates Gam, $G_0$, Gbm, the photonically generated charges q are directed either to the one or to the other accumulation gate or integration/diode node Ga, Gb.

In the design of the modulation gates, the central modulation gate $G_0$ may be omitted, if necessary. Alternatively, such a time-of-flight pixel can also be designed without modulation gates, as shown and described for example in EP 1 332 594 A1.

FIG. 2*b* shows a potential curve in which the charges q flow in the direction of the first integration node Ga, while the potential according to FIG. 2*c* allows the charges q to flow in the direction of the second integration node Gb. The potentials are specified according to the modulation signals provided. Depending on the application, the modulation frequencies are preferably in a range of 1 to 500 MHz or even higher. A modulation frequency of 1 MHz, for example, results in a time period of one microsecond, so that the modulation potential changes accordingly every 500 nanoseconds.

FIG. 2*a* also shows a readout unit 400, which may already be a component of a PMD time-of-flight sensor in the form of a CMOS or a receiving element 22. The integration nodes Ga, Gb formed as capacitors or diodes integrate the photonically generated charges over a plurality of modulation periods. In a known manner, the voltage then provided at the gates Ga, Gb can be tapped at high impedance, for example, via the readout unit 400. Here, the interconnection and evaluation of the first and second integration nodes Ga, Gb form a so-called A and B channel.

FIG. 3 shows a triangulation arrangement in which the time-of-flight sensor 22 is set up of a row of time-of-flight pixels 21. The illumination 10 emits a single modulated light beam, preferably a few um in diameter. When reflected from an object, the light beam impinges, depending on the distance of the object, onto the corresponding time-of-flight pixel 21. If the focal length of the lens 15 is fixed and the focus is at infinity, light beams reflected from distant objects are imaged sharp and point-like (solid line) and reflections from near objects are imaged blurred (dashed line).

By use of the location or the time-of-flight pixel at which the light beam is detected, a distance of the object can be determined, as known from triangulation. In addition to the geometric calculation of the location, the respective time-of-flight pixel 21 moreover provides the time-of-flight and thus a second distance value.

FIG. 4 shows the arrangement according to FIG. 3 in plan view. The area of the light spot increases depending on the distance from distant to near objects.

Especially in security applications, these diversely and redundantly obtained distance values can be processed separately, wherein a distance value is only output as valid if the deviation of the distance values is within predetermined tolerance limits. In particular, the distance values can also be evaluated independently via separate evaluation units, so that additional redundancy is present in the evaluation path.

Binning is a technique known for 2D and 3D image sensors in order to improve the sig-nal-to-noise ratio at the expense of resolution. In this process, evenly spaced pixels are combined into a single pixel and their signal values are either added together in the analog domain or averaged after conversion to the digital domain.

As shown in FIGS. 3 and 4, in the one-dimensional distance measurement triangulation effects cause the light spot to move above the sensor. This is true for any system in which the emission of the light signal does not take place vertically above the sensor, but with a distance between the emission and receiving channels. By use of an optical system with a fixed focal length, moreover, the size of the light spot changes depending on the object distance.

Time-of-flight applications are susceptible to interference from background light and noise from the pixel. A reduction of the read out pixel area to the size of the incident light spot reduces, among others, the proportion of extraneous light in the pixel current and thus improves the signal-to-noise ratio. For a sensor with a current readout, i.e., an active integrator outside the pixel array, the illuminated pixels in the current/charge domain can be analogously interconnected, while pixels with little to no active light can be discarded. Furthermore, the configurability of the binning is advantageous, for example, to compensate for manufacturing tolerances in the placement of emitter and receiver.

A sensor line of small pixels, which are suitable for the far range but too small for the near range, would have to be binned in a large switch matrix or within the sensor line. In this case, the large number of switches required has a negative impact on performance due to parasitic capacitance and leakage currents. However, pixels with optimized dimensions for each distance range lead to an irregular and thus unfavorable layout.

The concept according to the invention significantly reduces the wiring effort.

As shown schematically in FIG. 5, according to the invention it is envisaged to drive the pixels 21 of at least two sensor columns via a common shift register. Depending on the register value, the diode nodes Ga, Gb of the time-of-flight pixels 21 are switched either to column lines leading to a switching matrix 80 or to a discard/reset potential (not shown in FIG. 5). The switching matrix 80 is configured in such a way that several column lines can be routed together to a differential amplifier 100.

As shown in FIG. 6, for example, an SBI (suppression of background illumination) can also be integrated upstream of amplifier 100. According to the invention, it is now intended to switch one or more columns or column lines in groups to a common amplifier 100 via the switch matrix 80. During the exposure/integration time, the diode nodes Ga, Gb as well as the column lines cola, colb serve as integration capacitances for accumu-lating the charges photogenerated at the connected pixels. The voltage provided at the input of the differential amplifier 100 is amplified and can be tapped as a differential sig-nal at the output of the amplifier 100.

After the integration is completed, the column lines as well as the diode nodes Ga, Gb are set to reset potential.

FIG. 7 shows an example of a possible wiring of a pixel array according to the invention. The time-of-flight pixels 21 are denoted by BPIX in FIG. 7. In the example shown, each sensor column comprises two column lines cola, colb, which carry the charges of the pixels, depending on the register value, to a switch matrix 80 and via this to a differential amplifier 100.

Furthermore, the signal lines for the modulation gates Gam, Gbm, $G_0$, and, if necessary, separation gates sep are led column-wise. The registers FF of the shift register are connected to a clock line clk and a select line pix-sel_n. Via the select line pix-sel_n the pixels are driven depending on the register entry.

In addition, a line with the reset potential vreset is guided row by row.

As already described, the diode nodes Ga, Gb are switched depending on the register value either to the reset potential vrest or to the column lines cola, colb.

To further reduce the wiring effort, it is further provided, as shown in FIG. 8, to combine groups of at least four pixels in one sensor column. This hardwired binning within the array provides for a further reduction in the number of switches required. Thus, in combination with the shift register, the number of lines that need to be routed into the array is significantly reduced.

The shift register or the register FF assigned to the pixel group controls the switch groups S1 and S2 via the signal line px_sel_n<r>. In the example shown, when a signal is applied to sel_n, switch S2 is closed and switch S1 is opened via the NAND gate. If no signal is present. S1 closes and S2 opens. Thus, S1 and S2 are configured as toggle switches.

The diode nodes diode a, diode b of all combined pixels PMD1-4 can be switched together to the readout lines cola, colb via the switch group S1 and switched in common to the reset potential vreset via the switch group S2.

Here, one switch group is always open and the other closed. This prevents negative effects caused by saturating pixels that are not read out on neighboring pixels used for measurements. In the example shown, the diode nodes diode a, diode b of the time-of-flight pixels PMD1 to PMD4 are switched to the column lines cola, colb via the first switch S1. The switch S2, which connects the diode nodes diode a, diode b to the reset line vreset is open.

Due to the fixed focal length of the receiving optics, the spot becomes larger as it moves across the sensor row from far to near. This effect is exploited by writing the same data word to several adjacent shift registers in the near range. The number of registers writ-ten in the same way decreases from the near to the far range. This procedure can also save logic and wiring outside the pixel row.

The pixel currents connected to a readout line within a column are routed to the switch matrix 80 outside the pixel array, as shown in FIG. 9. Here, each column preferably has its own matrix 80.1. With this matrix, the currents of the column line cola, colb are routed to a common line, which is assigned to exactly one differential amplifier 100. I.e., readouta/b<1> is assigned to a first amplifier 100.1 and readouta/b<n> is assigned to an n-th amplifier 100.*n*.

Thus, it is possible to combine several columns in the x-direction. For the far range, due to the small light spot, it may be intended to assign only one column to an amplifier. Un-used columns, can be switched to a discard node or discard potential discard within the switch matrix. This effectively prevents negative effects on pixels in neighboring columns.

Figure 10:
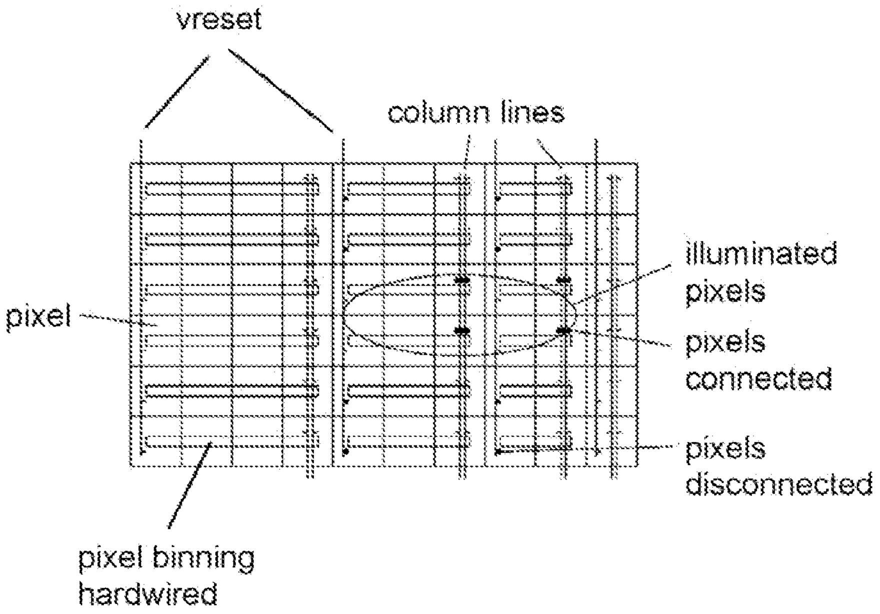

FIG. 10 schematically shows another variant in which the columns are hardwired according to their distance range. For example, four pixels are wired in the left area for the far range and to the left decreasing in number of columns from three, two to one for the near range. The illuminated pixels are connected to the differential amplifier 100, while the non-illuminated pixels are turned off, i.e., switched with their diode nodes to a reset potential.

The exemplary embodiments shown can be applied individually as well as in combination. In particular, it is conceivable to hardwire a part of the sensor while another part of the sensor is connected to the amplifiers 100 via a switch matrix 80.

For distance measurement it is advantageous to perform several measurements, for example, by first determining the location of the incoming light spot in a raw measurement. After the location is determined, the columns in which no light is incident can be switched to the reset potential. Thus, basically the x-position of the light spot is determined.

Moreover, the register entries can be adapted, so that in the y-direction only the illuminated pixels are evaluated.

LIST OF REFERENCE SYMBOLS

1 PMD distance measurement system
10 illumination module
15 beam shaping optics
20 time-of-flight camera
21 time-of-flight pixel
22 time-of-flight sensor
25 receiving optics
30 modulator
35 phase shifter
40 object
80 switch matrix
90 SBI
100 amplifier
400 readout unit
Ga integration node, diode node channel A
Gb integration node, diode node channel B
Gam modulation gate
Gbm modulation gate
G0 modulation gate
FF register, shift register

The invention claimed is:

1. A photonic mixing detector time-of-flight sensor (22) for an optical distance measurement system, comprising an array of photonic mixing detector time-of-flight pixels (21),
wherein the time-of-flight pixels comprise diode nodes (Ga, Gb) for an A and a B channel (A, B), and are connectable via a first switch (S1) to an associated column line (cola, colb) and via a second switch (S2) to a reset potential (vreset);
comprising a plurality of shift registers which are constructed and connected to the pixels in such a way that, starting from register entries of the individual registers (FF), the two switches (S1, S2) can be switched over alternately, wherein at least partially a plurality of columns or rows are assigned to a shift register;
comprising a switch matrix (80) which is configured in such a way that the column lines (cola, colb) can be switched to one of a plurality of amplifiers (100), and a plurality of column lines (cola, colb) can be switched to a common amplifier (100),
wherein the time-of-flight sensor (22) is configured in such a way that during an integration time, the charges photogenerated at the time-of-flight pixel are accumulated at the diode nodes (diode a, diode b) and the connected column lines (cola, colb).

2. The time-of-flight sensor (22) according to claim 1,
wherein the time-of-flight pixels (21, PMD) in a column are combined into groups of at least two pixels and this pixel group comprises channel-wise a single first and a single second switch (S1, S2) in common.

3. A distance measurement device (1) comprising the time-of-flight sensor (22) according to claim 1, wherein the time-of-flight sensor is configured for distance determination according to the principle of a time-of-flight based phase measurement and according to the principle of triangulation.

* * * * *